(12) United States Patent
Coburn et al.

(10) Patent No.: US 10,322,721 B2
(45) Date of Patent: Jun. 18, 2019

(54) ADAPTIVE CRUISE CONTROL SYSTEM HAVING CENTER-CONSOLE ACCESS

(71) Applicant: Faraday & Future Inc., Gardena, CA (US)

(72) Inventors: Matthew Joseph Coburn, Redondo Beach, CA (US); Jennifer A. Lin, Los Angeles, CA (US); Leonard Konrad Wozniak, Los Angeles, CA (US); Richard S. Kim, Los Angeles, CA (US); Pontus Anthony Fontaeus, Newport Beach, CA (US); Stewart Douglas Taylor, Los Gatos, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/636,168

(22) Filed: Jun. 28, 2017

(65) Prior Publication Data

US 2018/0141548 A1 May 24, 2018

Related U.S. Application Data

(60) Provisional application No. 62/355,747, filed on Jun. 28, 2016.

(51) Int. Cl.
*B60W 30/14* (2006.01)
*B60K 35/00* (2006.01)
*B60K 37/06* (2006.01)

(52) U.S. Cl.
CPC .......... *B60W 30/143* (2013.01); *B60K 35/00* (2013.01); *B60K 37/06* (2013.01);
(Continued)

(58) Field of Classification Search
CPC .............. B60W 50/082; B60W 30/143; B60K 2310/20; B60K 2310/30; B60K 35/00;
(Continued)

(56) References Cited

U.S. PATENT DOCUMENTS

| 8,374,743 | B2* | 2/2013 | Salinger | G05D 1/0246 701/23 |
| 8,818,608 | B2* | 8/2014 | Cullinane | B60W 30/00 701/23 |

(Continued)

*Primary Examiner* — Emma K Frick
(74) *Attorney, Agent, or Firm* — Veros Legal Solutions, LLP

(57) ABSTRACT

An adaptive cruise control system for a vehicle may include an access device configured to receive manual input and responsively generate control signals for use in controlling acceleration, braking and steering of a vehicle. The adaptive cruise control system may also include at least one additional device located remote from the access device and configured to receive manual input and responsively generate control signals for use in controlling acceleration, braking and steering of the vehicle. The adaptive cruise control system may further include a controller in communication with the access device and the at least one additional device. The controller may be configured to control acceleration, braking and steering of the vehicle based on the manual input received via the access device and the at least one additional device.

7 Claims, 3 Drawing Sheets

(52) U.S. Cl.
CPC ...... *B60K 2310/20* (2013.01); *B60K 2310/30* (2013.01); *B60K 2350/102* (2013.01); *B60K 2350/1048* (2013.01); *B60K 2350/925* (2013.01); *B60W 2540/00* (2013.01); *B60W 2710/18* (2013.01); *B60W 2710/20* (2013.01); *B60W 2720/106* (2013.01)

(58) Field of Classification Search
CPC ...... B60K 2350/102; B60K 2350/1048; B60K 2350/925
USPC .......................................................... 180/170
See application file for complete search history.

(56) References Cited

U.S. PATENT DOCUMENTS

| | | | | |
|---|---|---|---|---|
| 8,924,150 B2* | 12/2014 | Tsimhoni | ............. | G01C 21/365 340/691.1 |
| 9,007,199 B2* | 4/2015 | Yamada | ................... | G07C 5/00 340/438 |
| 9,174,642 B2* | 11/2015 | Wimmer | ................ | B60K 35/00 |
| 9,182,759 B2* | 11/2015 | Wimmer | ................ | B60W 50/14 |
| 9,216,743 B2* | 12/2015 | Wimmer | ................ | B60W 50/00 |
| 9,348,334 B2* | 5/2016 | McGinn | ................ | G05D 1/0061 |
| 9,436,182 B2* | 9/2016 | Nemec | ................. | G05D 1/0055 |
| 9,580,080 B1* | 2/2017 | Letwin | ................ | B60W 50/082 |
| 9,616,896 B1* | 4/2017 | Letwin | ................ | B60W 30/182 |
| 9,845,866 B2* | 12/2017 | Drees | ................. | B60W 30/182 |
| 10,053,110 B2* | 8/2018 | Li | ......... | B60W 50/08 |
| 2012/0271500 A1* | 10/2012 | Tsimhoni | ................ | B62D 1/28 701/23 |
| 2015/0276515 A1* | 10/2015 | Shibata | ..................... | G01L 1/22 73/862.044 |
| 2016/0378320 A1* | 12/2016 | Suzuki | ................. | G06F 3/0338 345/158 |
| 2018/0011551 A1* | 1/2018 | Gothlin | .................. | B60K 37/04 |
| 2018/0059662 A1* | 3/2018 | Sato | ........................ | B60K 35/00 |
| 2018/0105186 A1* | 4/2018 | Motomura | ............ | B60W 50/14 |
| 2018/0208212 A1* | 7/2018 | Suessenguth | ........ | B60W 50/082 |
| 2018/0215396 A1* | 8/2018 | Miyahara | .............. | B60W 50/14 |
| 2018/0304749 A1* | 10/2018 | Cho | ........ | B60K 37/06 |
| 2018/0334106 A1* | 11/2018 | Beauregard | ............... | B60R 7/04 |

* cited by examiner

ADAPTIVE CRUISE CONTROL SYSTEM HAVING CENTER-CONSOLE ACCESS

CROSS-REFERENCE TO RELATED APPLICATIONS

This application claims the benefit of U.S. Provisional Application No. 62/355,747, filed Jun. 28, 2016, the entirety of which is hereby incorporated by reference.

TECHNICAL FIELD

The present disclosure relates generally to an adaptive cruise control system for semi-autonomously controlling a vehicle and, more particularly, to an adaptive cruise control system having center-console access.

BACKGROUND

An adaptive cruise control (ACC) system controls acceleration, braking, and steering of a vehicle to guide the vehicle within a lane, to switch lanes, to park the vehicle, to pass other vehicles, and/or to maintain a following space in front of the vehicle. The ACC system relies on sensory feedback (e.g., feedback from radar sensors, LiDAR sensors, GPS sensors, and cameras) to detect a current vehicle location and to recognize roadside features and other vehicles within an immediate vicinity. The ACC system also relies on stored information (e.g., maps, road quality information, traffic information, construction information, weather information, etc.) regarding an area in which the vehicle is operating.

Existing ACC systems are semi-autonomous and require at least some input from a human operator. For example, a typical ACC system may need to be manually activated and has settings that can be specified by the operator. These settings may include, for example, a distance of the following space to be maintained in front of the vehicle; when the vehicle should change lanes, pass another vehicle, or park itself; a desired speed or travel route; etc. In addition, some ACC systems require periodic input from the operator in order to continue semi-automated control, even if the input does not include an adjustment to current settings. The different inputs described above are received from the operator via the steering wheel (e.g., via buttons, switches, toggles, dials, knobs, etc. that are housed within or around the steering wheel) in conventional ACC system arrangements.

Although the arrangements of conventional ACC systems may be suitable for some applications, they are still less than optimal. Specifically, because the input devices of the conventional arrangements are housed within or around the steering wheel, the operator may need to remain sitting upright and within arm's reach of the steering wheel. This position may be uncomfortable, tiring, and/or inconvenient for extended travel.

The ACC system and center-console access device of the present disclosure may mitigate or solve one or more of the problems set forth above and/or other problems in the art.

SUMMARY

One aspect of the present disclosure is directed to an access device for an adaptive cruise control system. The access device comprises a base, and a handle portion slidingly connected to the base. The handle portion may be movable from a stowed position at least partially within the base, to an active position away from the base. The access device may be configured to generate control signals for the adaptive cruise control system when the handle portion is in the active position.

Another aspect of the present disclosure is directed to an adaptive cruise control system for a vehicle. The adaptive cruise control system may include an access device configured to receive manual input and responsively generate control signals for use in controlling acceleration, braking and steering of the vehicle. The adaptive cruise control system may also include at least one additional device located remote from the access device and configured to receive manual input and responsively generate control signals for use in controlling acceleration, braking and steering of the vehicle. The adaptive cruise control system may further include a controller in communication with the access device and the at least one additional device. The controller may be configured to control acceleration, braking and steering of the vehicle based on the manual input received via the access device and the at least one additional device Yet another aspect of the present disclosure is directed to a vehicle. The vehicle may include a rolling chassis, and a center console located between a driver seat and a passenger seat. The vehicle may also include an access device mounted to the center console, and a controller in communication with the rolling chassis and the access device. The controller may be configured to control acceleration, braking and steering of the rolling chassis based on manual input received via the access device.

DETAILED DESCRIPTION

The disclosed adaptive cruise control (ACC) system may provide a unique access device, which allows a human operator to call up functions of the ACC system. These functions may include, among other things, activation of the ACC system and specification of system settings. The disclosed access device may be comfortably and conveniently located within an associated vehicle, for example within a center console. This location may allow the operator to recline, to push back from a steering wheel, or to perform other functions while still having access to system controls. This location may also allow another person in the vehicle (e.g., a passenger) to control operations of the vehicle in some situations. In addition, the disclosed access device may be adjustable in a number of unique ways to allow the operator to intuitively provide corresponding control instructions to the ACC system. The disclosed access device may also provide an indication when the ACC system is available for use, provide haptic feedback during use, and be stowable when not in use.

Figure 1:
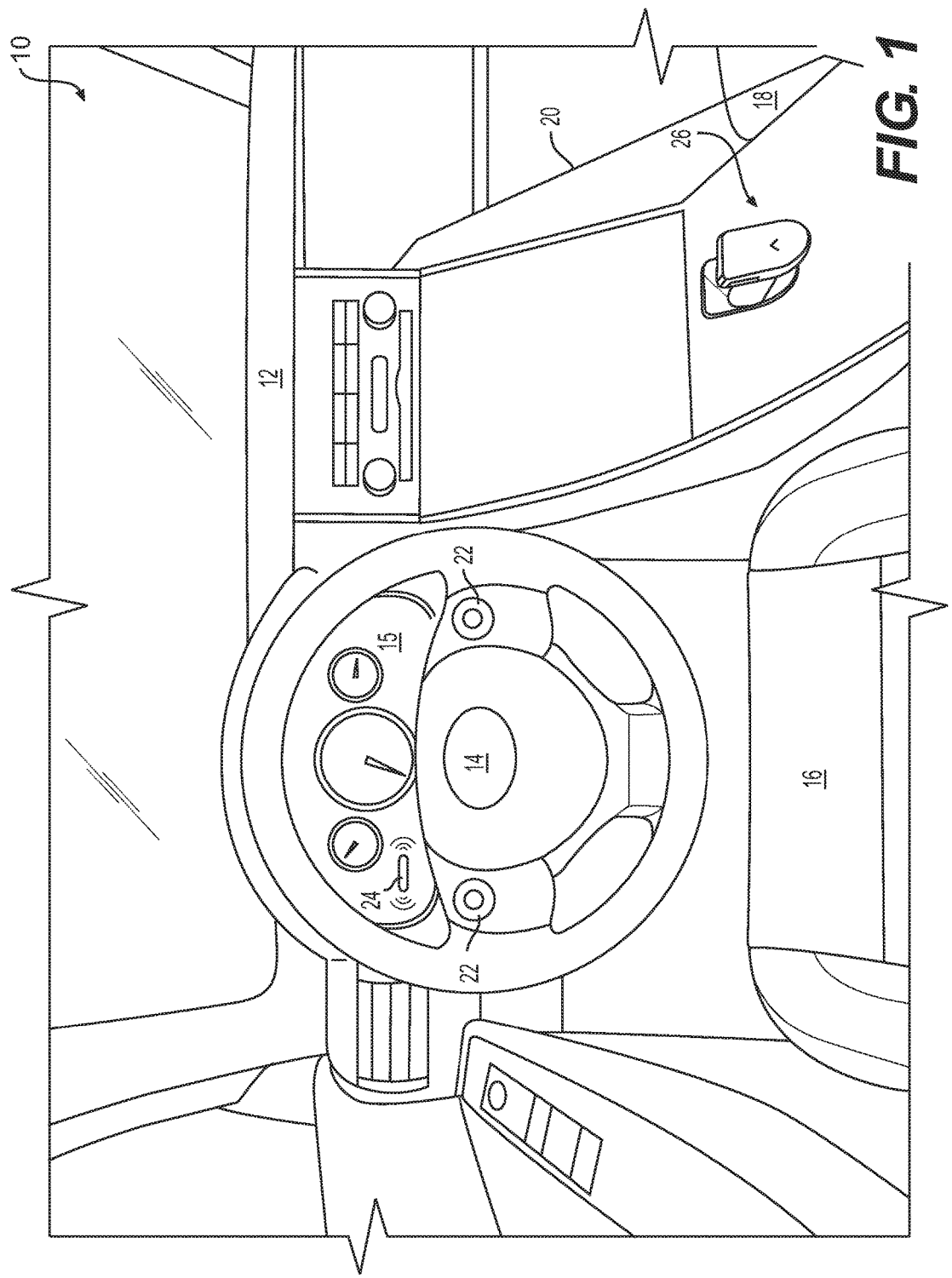
FIG. 1 is a perspective illustration of an exemplary vehicle.

FIG. 1 illustrates an exemplary vehicle 10, from an interior perspective. Vehicle 10 may be a sports car, a coupe, a sedan, a pick-up truck, a station wagon, a sports utility vehicle (SUV), a minivan, a conversion van, or have any other body style. Vehicle 10 may be electrically powered (e.g., by a battery, a fuel cell, or a tether), powered by a conventional (e.g., diesel, gasoline, or gaseous-fueled) internal combustion engine, or powered by a combination of these technologies (e.g., vehicle 10 may be a hybrid vehicle). Vehicle 10 may be operable by a driver and/or a passenger occupying vehicle 10. For the purposes of this disclosure, the driver and the passenger may both be generically referred to as an operator of vehicle 10.

As illustrated in FIG. 1, vehicle 10 may be equipped with a dashboard 12, which houses and/or supports a steering wheel 14 and an instrument cluster 15 located proximate steering wheel 14 (e.g., in front of steering wheel 14 relative to a normal forward travel direction of vehicle 10). In the disclosed embodiment, steering wheel 14 is asymmetrically mounted inside vehicle 10 (e.g., to a lateral side of vehicle 10). A driver seat 16 may be located inside vehicle 10 and behind steering wheel 14, while a passenger seat 18 may be located inside vehicle 10 and adjacent driver seat 16. Driver seat 16 may be separated from passenger seat 18 by a center console 20.

Steering wheel 14 may have any shape, configuration, and functionality. For example, steering wheel 14 may be generally circular (shown in FIG. 1), and electrically, hydraulically, and/or mechanically connected to wheels 21 (shown in FIG. 2) of vehicle 10. Torsional input provided by the operator of vehicle 10 via steering wheel 14 may be transmitted via the electric, hydraulic, and/or mechanical connection(s) to wheels 21 to thereby steer vehicle 10. In some embodiments, steering wheel 14 may have additional input devices 22 mounted thereon (shown in FIGS. 1 and 2) or nearby that can be used to control other features and/or functionality (e.g., semi-autonomous operation) of vehicle 10.

Instrument cluster 15 may be a collection of one or more co-located instruments, displays, lights, and/or other visual indicators, which provide performance information associated with vehicle 10 to the operator. The instruments may be analog, digital, or a mix of analog and digital devices. For example, at least one digital visual indicator 24 may be included within instrument cluster 15 and useable in association with semi-autonomous operation of vehicle 10.

Center console 20 may perform multiple different functions including, but not limited to, storage functions, control functions, and infotainment functions. In the disclosed embodiment, center console 20 extends from dashboard 12 through a center isle between driver and passenger seats 16, 18. It is contemplated, however, that center console 20 could be separated from dashboard 12. Center console 20 may include any number of compartments, cup holders, coin slots, power ports, data ports, vents, etc. Additionally or alternatively, center console 20 may include controls, displays, and instrumentation. As shown in FIG. 1, the disclosed exemplary center console 20 includes at least one access device 26 located remote from input devices 22 and useable in association with semi-autonomous operation of vehicle 10.

Figure 2:
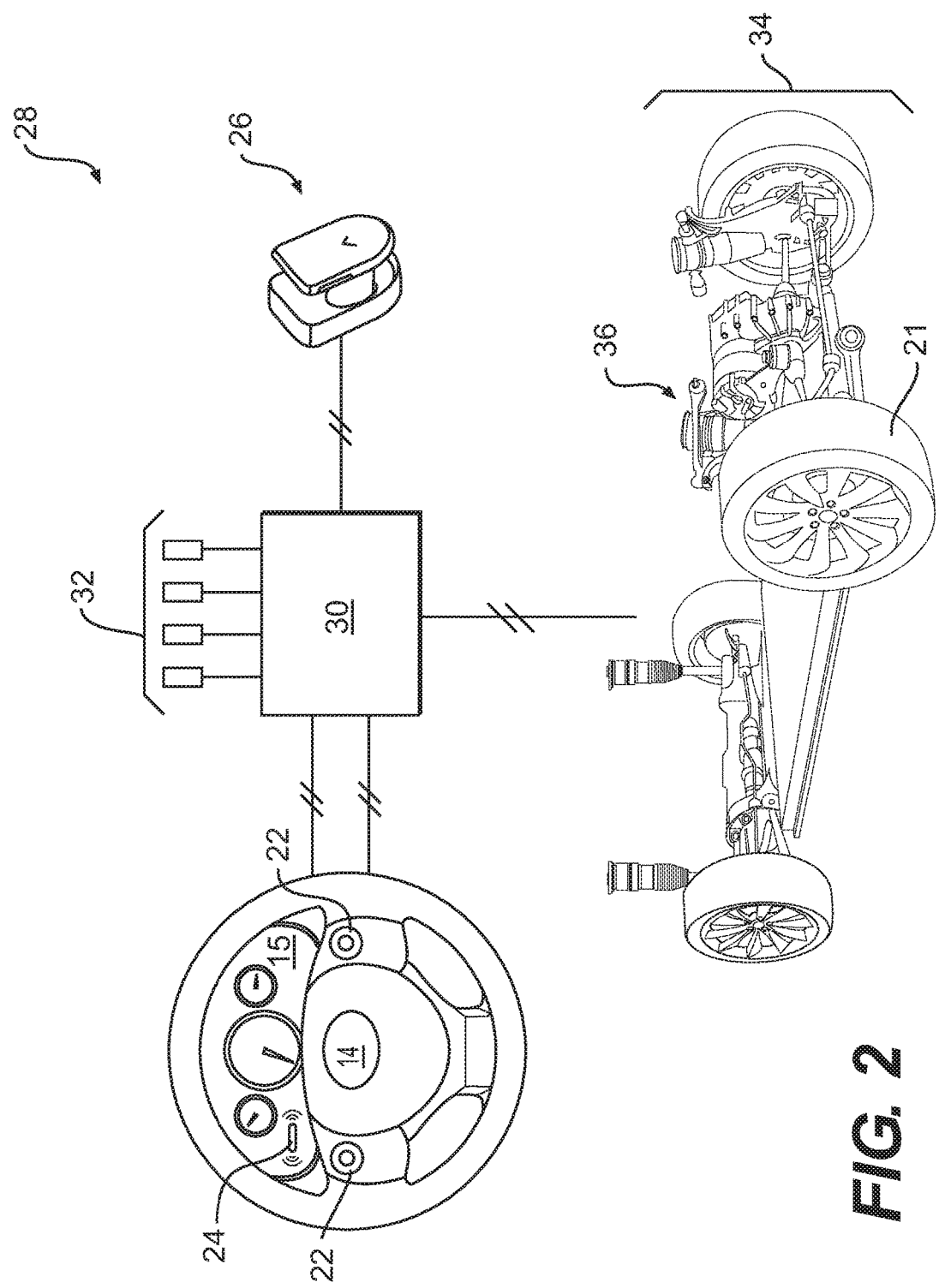
FIG. 2 is a diagrammatic illustration of an exemplary adaptive cruise control system that may be used to control some operations of the vehicle of FIG. 1.

FIG. 2 is a diagrammatic illustration of an exemplary adaptive cruise control (ACC) system 28, which may be used to semi-autonomously control acceleration, braking, steering, and/or other operations of vehicle 10. ACC system 28 may include, among other things, a controller 30 that is in communication with steering wheel 14 (e.g., with input devices 22), instrument cluster 15 (e.g., with visual indicator 24), access device 26, one or more sensors 32, and a rolling chassis 34 of vehicle 10. As will be explained in more detail below, controller 30 may be configured to receive input (e.g., manual and/or sensory input) by way of input devices 22, access device 26, and/or sensors 32, and responsively regulate operation of rolling chassis 34 to thereby semi-autonomously control the acceleration, braking, steering, and/or other operations of vehicle 10.

Controller 30 may embody a single processor or multiple processors that include a means for controlling an operation of ACC system 28. Numerous custom designed or commercially available processors may perform the functions of controller 30. For example, the processor may be a CPU, a GPU, a microprocessor, and other type of processing devices that include integrated circuits for processing information and data. Controller 30 may include or be associated with a memory for storing data such as, for example, performance characteristics or specifications of input devices 22, access device 26, sensor(s) 32, and/or rolling chassis 34; operational instructions; and corresponding parameters of vehicle 10. Various other known circuits may be associated with controller 30, including power supply circuitry, signal-conditioning circuitry, solenoid driver circuitry, communication circuitry, and other appropriate circuitry. Moreover, controller 30 may be capable of communicating with other components of ACC system 28 or other components of vechile 10 via either wired or wireless transmission.

Each of sensor(s) 32 may be any type of sensor conventionally used in semi-autonomous control of vehicle 10. For example, each sensor 32 could embody a radar sensor, a LiDAR sensor, a camera, a GPS sensor, a speed sensor, an acceleration sensor, an earth magnetic field sensor, etc. Each of these sensors 32 may be configured to generate signals indicative of a measured and/or monitored parameter, and to direct the signals to controller 30 for further processing.

Rolling chassis 34 may include, among other things, a plurality of wheels 21 (e.g., four wheels—one located at each corner of vehicle 10), and a drivetrain 36 (e.g., an engine, a generator, a battery, a fuel cell, a motor, a transmission, axles, driveshafts, braking devices, steering actuators and likages, etc.) that is configured to accelerate, brake, and/or steer wheels 21. Any one or more of the components of rolling chassis 34 may be manually and/or semi-autonomously controlled. For example, the operator of vehicle 10 may be able to press an accelerator pedal (not shown) or a brake pedal (not shown) to thereby affect acceleration and braking of rolling chassis 34, and also to turn steering wheel 14 to thereby effect steering of rolling chassis 34. In similar manner, controller 30 may generate commands directed to actuators (not shown) of these same and/or different components to semi-autonomously affect acceleration, braking, and steering.

The semi-automated acceleration, braking, and steering of rolling chassis 34 may be implemented by controller 30 when existing conditions satisfy corresponding semi-autonomous prerequisites. Any number and type of threshold can be used as a pre-requisite for activation of semi-autonomous control. For example, one or more thresholds could be associated with confirmed operation of vehicle 10 (e.g., of sensor(s) 32), confirmed location of vehicle 10 (e.g., vehicle 10 being on a particular roadway), confirmed traffic conditions, confirmed weather conditions, confirmed performance parameters (e.g., vehicle speed), etc. When the existing conditions are determined to satisfy the semi-autonomous prerequisites, controller 30 will allow the operator to activate the semi-autonomous control functionality of vehicle 10.

The semi-autonomous control functionality may be selectively activated in accordance with input from the operator. In particular, the operator may be able to turn semi-autonomous control on and off, and also to adjust settings of the control via input devices 22 and/or access device 26. For example, the operator may be able to initiate, adjust, and/or cancel an acceleration, deceleration, and/or speed of vehicle 10 via input devices 22 and/or access device 26. Similarly, the operator may be able to initiate, adjust, and/or cancel a vehicle follow distance, a lane change, and/or vehicle passing via input devices 22 and/or access device 26. The operator of vehicle 10 may be able to use only input devices 22, only access device 26, or both of input and access devices 22, 26 at the same time or interchangeably to provide the corresponding input. In this way, the operator may use whatever device is most comfortable, convenient, and compatible with a current position and/or activity of the operator.

Figure 3:
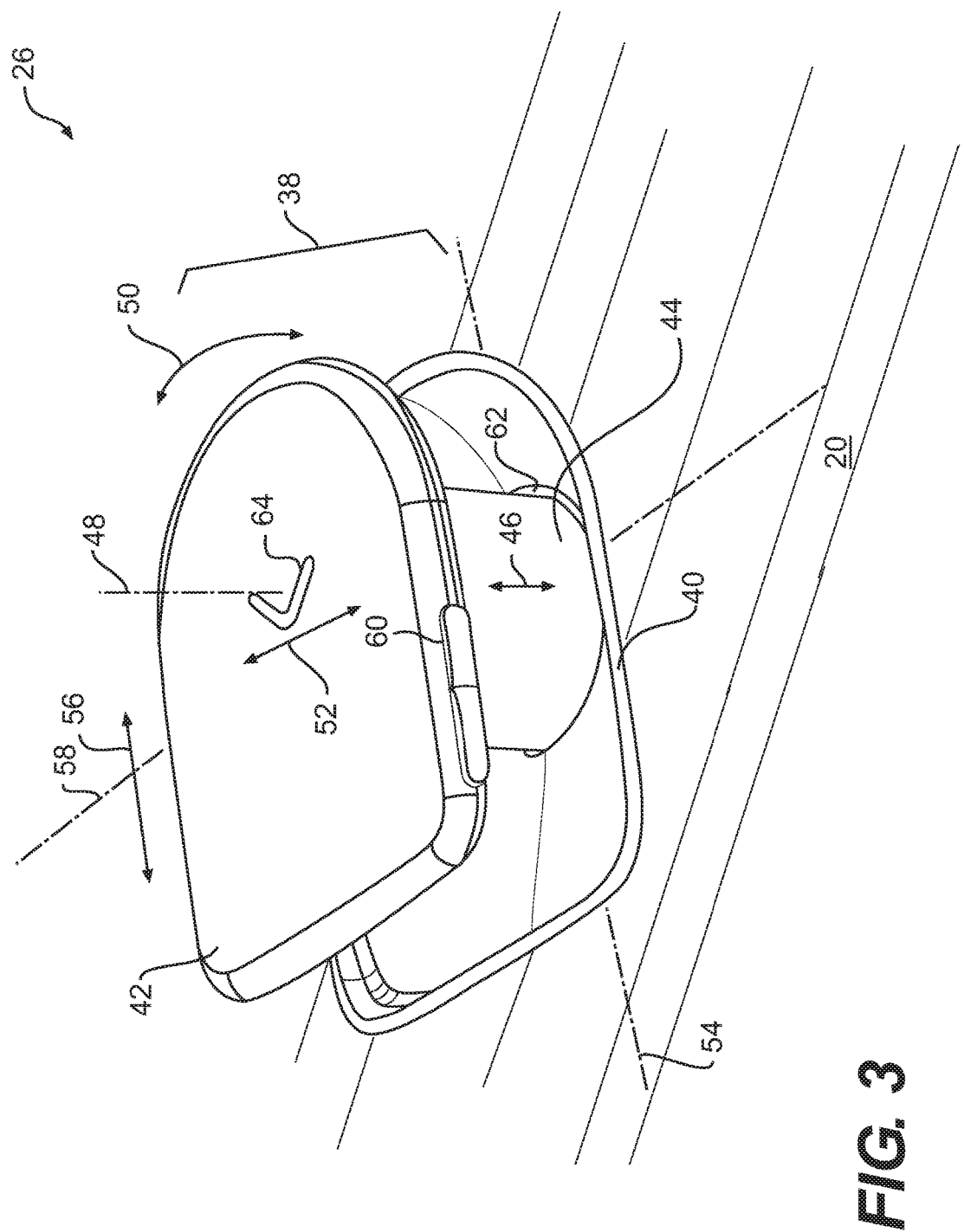
FIG. 3 is a perspective illustration of an exemplary access device that may be used by an operator to provide input to the adaptive cruise control system of FIG. 2.

An exemplary access device 26 is shown in the perspective illustration of FIG. 3. As can be seen in this figure, access device 26 may include a handle portion 38 and a base 40. Handle portion 38 may be configured to move (e.g., in the direction of an arrow 46) between an extended or active position (shown in FIG. 3) and a stowed or standby position (not shown) that is at least partially inside of base 40. In one embodiment, access device 26 includes a powered actuator (e.g., an electric motor—not shown) that raises and/or lowers handle portion 38 relative to base 40. In another embodiment, handle portion 38 is spring-biased away from base 40 toward the active position, and held in the stowed position within base 40 by a mechanical latch (not shown). Other configurations of handle portion 38 and base 40 may also be possible.

Handle portion 38 may include, among other things, a handle 42 and a stem 44 that extends normally from an inner or lower surface of handle 42 toward base 40. Handle 42 may be generally flat, and have a curved leading end and a generally rectangular (e.g., square) trailing end aligned with the travel direction of vehicle 10. Stem 44 may be generally cylindrical and slidingly received within a corresponding bore of base 40. With this configuration, handle 42 may move toward or away from base 40 as stem 44 slides into or out of the bore of base 40, respectively. When handle portion 38 is in the stowed position, an upper surface of handle 42 may generally lie in a plane that is common with an upper edge of base 40 surrounding handle 42.

Operator of vehicle 10 may provide input to access device 26 by e.g., operating or interacting with handle portion 38. In some embodiments, handle portion 38 may be selectively moved in the direction of arrow 46 to generate signals associated with semi-autonomous control over vehicle 10. For example, after handle portion 38 has moved to the active position away from base 40, pressing down on handle 42 may generate a control signal that establishes a current travel speed as a desired travel speed. In one embodiment, the pressing down on handle 42 to set the travel speed may be a movement of force and/or distance that is less than required to return handle portion 38 to its stowed position.

Handle portion 38 may be configured to move in additional ways relative to base 40 (i.e., in addition to moving in the direction of arrow 46). In particular, handle portion 38 may be configured to twist and/or tilt in one or more directions, upon user operation, to generate corresponding control signals. For example, handle portion 38 may be configured to twist about a stem axis 48 in the direction of an arrow 50 to generate control signals that activate turn indicators and instruct controller 30 to initiate semi-autonomous lane switching in the direction of the twist (e.g., to the left or to the right, depending on the twist direction). In addition, handle portion 38 may be configured to tilt in the direction of an arrow 52 about a longitudinal axis 54 (i.e., an axis generally aligned with the travel direction of vehicle 10) to generate control signals that instruct controller 30 to switch between vehicle control modes, such as available modes of semi-autonomous control (e.g., a drive mode, a traffic assist mode, an economy mode, etc.). Further, handle portion 38 may be tilted in the direction of an arrow 56 about a transverse axis 58 (i.e., an axis generally perpendicular to the travel direction of vehicle 10) to generate control signals that instruct controller 30 to semi-autonomously adjust the vehicle follow distance (e.g., to close the distance when tilted forward or to increase the distance when tilted backward) and/or travel speed (e.g., to speed up when tilted forward or to slow down when tilted backward). Handle portion 38 may be neutrally biased (e.g., weight- and/or spring-biased to a neutral position at which no control signals are being generated), with regard to the pushing, tilting, and/or twisting described above.

One or more additional control devices (e.g., buttons, switches, knobs, dials, etc.) may be mounted on handle portion 38 for use by the operator in association with semi-autonomous control of vehicle 10. For example, a rocker switch 60 is shown at a transverse side of handle 42 that can be pressed by the operator to set and/or change a desired speed, acceleration, deceleration, and/or follow distance of vehicle 10. Additional and/or other control devices may be mounted to handle portion 38 and used for this same or additional purposes, if desired.

Base 40 may be at least partially recessed within an upper surface of center console 20 (referring to FIG. 1) and configured to receive handle portion 38. Base 40 may include a bowl surrounded by a rim and having a bore formed in a center of the bowl. As described above, the bore may be configured to slidingly receive stem 44 of handle portion 38. The bowl of base 40 may be configured to receive handle 42, when handle portion 38 is moved to the stowed position such that an upper flat surface of handle 42 is flush with the rim of base 40. In the disclosed embodiment, base 40 is completely recessed within the upper surface of center console 20, such that the rim of base 40 is also flush with the upper surface of center console 20. In embodiments where the movement of handle portion 38 is powered, corresponding actuators (not shown) may be housed within handle portion 38, within base 40, and/or within center console 20 (e.g., below base 40).

In some embodiments, access device 26 may include illumination elements and/or indication elements. For example, one or more lights 62, 64 may be provided within handle portion 38 (within the upper flat surface of handle 42), with base 40, and/or within spaces between handle portion 38 and base 40 (e.g., within an annular gap between the bore of base 40 and stem 44). In one embodiment, illumination of lights 62 and/or 64 may be indicative of an availability of semi-autonomous control. For example, when the semi-autonomous prerequisites described above are satisfied by the current operating conditions of vehicle 10, lights 62 and/or 64 may be selectively illuminated to alert the operator of the available functionality. In other embodiments, lights 62 and/or 64 may be illuminated after the operator has activated the semi-autonomous control of vehicle 10, thereby alerting the operator of the active status. In yet other embodiments, lights 62 and/or 64 may be illuminated regardless of the availability and/or active status of the semi-autonomous control functionality. For example, lights 62 and/or 64 may be continuously illuminated, illuminated whenever lighting conditions inside vehicle 10 are low, illuminated whenever other vehicle lights (not shown) are illuminated, or illuminated according to another strategy.

It is contemplated that access device 26 could provide haptic feedback, in some embodiments. For example, access device 26 may provide resistance to some operator input (e.g., to twisting and/or tilting), provide vibrations, generate noise, selectively illuminate lights 62 and/or 64, adjust illumination (e.g., change a color) of lights 62 and/or 64, and/or provide some other type of haptic feedback. The haptic feedback could be provided when a requested maneuver (e.g., lane changing, acceleration, follow space closing, etc.) is not possible or unadvisable. It is also contemplated that the haptic feedback could change (e.g., increase in intensity) as the requested maneuver changes or becomes even less advisable.

During operation, controller 30 may continuously monitor current conditions and compare the current conditions with the various semi-autonomous control prerequisites to determine if semi-autonomous control should be made available to the operator. When the current conditions are appropriate for semi-autonomous control (i.e., when the prerequisites have been satisfied), controller 30 may provide a corresponding signal to the operator. In some embodiments, this may include illumination of indicator 24 (referring to FIG. 2) within instrument cluster 15 and/or illumination of lights 62 and/or 64 within access device 26. The illumination(s) may alert the operator that, if desired, semi-autonomous control could be activated at that time.

The operator may selectively activate semi-autonomous control of vehicle 10 (i.e., only after the functionality becomes available) in multiple ways. For instance, the operator may manipulate (e.g., touch, press, move, or otherwise operate) input devices 22 on steering wheel 14 to activate semi-autonomous control of vehicle 10 in the conventional manner. Additionally or alternatively, the operator may manipulate (e.g., touch, press, move, or otherwise operate) access device 26 to activate semi-autonomous control of vehicle 10. For example, the operator may press down on handle 42, thereby causing handle portion 38 to rise from the stowed position inside of base 40 to the active position above base 40. The pressing down of handle 42 may energize the associated actuator to power handle portion 38 to the active position in one embodiment, or only release handle portion 38 so that it can be spring-biased to the active position in another embodiment. It is contemplated that, in some embodiments, the actuator associated with handle portion 38 may be automatically activated (e.g., by controller 30) to raise and/or lower handle portion 38.

Regardless of the way in which handle portion 38 is moved to the active position, this movement (and/or the action that initiates the movement) may trigger semi-autonomous control of vehicle 10. In response to this triggering, controller 30 may assume control over vehicle acceleration, braking, and steering. The operator may then manually adjust settings of the semi-autonomous control by twisting handle 42, tilting handle 42, and/or pushing rocker switch(es) 60 on handle 42 in the manners described above.

The semi-autonomous control of vehicle 10 may end when conditions of vehicle 10 no longer satisfy the prerequisites of such control and/or when the operator indicates a desire to end the semi-autonomous control. The operator may indicate the desire to end semi-autonomous control of vehicle 10 by manipulating input devices 22 on steering wheel 14 in the conventional manner and/or by pushing handle portion 38 of access device 26 back to its stowed position inside of base 40. When current condition no longer satisfy the prerequisites of semi-autonomous control, the operator may be alerted to the situation via visual indicator 24, via lights 62 and/or 64, via haptic feedback, or in another manner.

It will be apparent to those skilled in the art that various modifications and variations may be made to the disclosed ACC system and access device. Other embodiments will be apparent to those skilled in the art from consideration of the specification and practice of the disclosed ACC system and access device. It is intended that the specification and examples be considered as exemplary only, with a true scope being indicated by the following claims and their equivalents.

What is claimed is:

1. An adaptive cruise control system for a vehicle, comprising:
   an access device configured to receive manual input and responsively generate control signals for use in controlling acceleration, braking and steering of the vehicle;
   at least one additional device located remote from the access device and configured to receive manual input and responsively generate control signals for use in controlling acceleration, braking and steering of the vehicle; and
   a controller in communication with the access device and the at least one additional device, the controller being configured to control acceleration, braking and steering of the vehicle based on manual input received via the access device and the at least one additional device;
   wherein the access device is configured to move in an axial direction to set a desired travel speed, and
   wherein the access device is configured to tilt in a first direction to adjust the desired travel speed; and the access device is configured to tilt in a second direction to indicate a desire to switch control modes.

2. The adaptive cruise control system of claim 1, wherein:
   the access device is configured to move from a stowed position to an extended and active position; and
   the access device is configured to generate the control signals when in the extended and active position.

3. The adaptive cruise control system of claim 2, wherein:
   the access device comprises a handle and a base with a rim; and
   an upper flat surface of the handle is flush with the rim of the base when the access device is in the stowed position.

4. The adaptive cruise control system of claim 1, further comprising:
   at least one sensor configured to sense an operating condition of the vehicle; and
   at least one light mounted on the access device, wherein the controller is configured to:
      determine based on the operating condition of the vehicle when control functionality is available; and
      selectively illuminate the at least one light only when control functionality is available.

5. The adaptive cruise control system of claim 4, wherein:
   the access device comprises a handle, a base, and a stem that extends normally from the handle into a bore in the base; and
   the at least one light is located in an annular gap between the stem and the bore in the base.

6. The adaptive cruise control system of claim 1, wherein the access device is configured to twist to indicate a desire to switch lanes.

7. The adaptive cruise control system of claim 1, wherein the access device comprises a rocker switch configured to generate a signal indicative of a desired vehicle follow distance.

* * * * *